United States Patent Office 3,549,691
Patented Dec. 22, 1970

3,549,691
ARALKYLOXY ALKANOIC ACIDS
Thomas Leigh and Leslie Arthur McArdle, Macclesfield, England, assignors to Imperial Chemical Industries Limited, London, England, a corporation of Great Britain
No Drawing. Filed June 8, 1967, Ser. No. 644,492
Claims priority, application Great Britain, June 23, 1966, 28,199/66
Int. Cl. C07c 69/02, 103/26
U.S. Cl. 260—473          6 Claims

ABSTRACT OF THE DISCLOSURE

The disclosure relates to aralkyloxy- or aralkylthio-alkanoic acid derivatives which lower the concentration of cholesterol and/or triglycerides in blood serum and reduce the level of fibrinogen in blood plasma, and which possess anti-inflammatory activity. The disclosure further relates to pharmaceutical compositions containing such compounds and to a method of using such compounds in the treatment of coronary artery disease and atherosclerosis. Representative of the compounds disclosed is α-p-chlorobenzyloxy-methylpropionic acid.

---

This invention relates to new acid derivatives which possess valuable therapeutic properties.

It is believed that certain diseases such as coronary artery disease and atherosclerosis in man are associated with an abnormally high concentration of triglyceride and/or cholesterol in the blood serum. We have now found that certain aryl derivatives of aliphatic acids reduce the concentration of cholesterol and/or triglycerides in the blood serum of rats, and also reduce the level of fibrinogen in the blood plasma of rats, and they are therefore considered to be useful in the treatment or prophylaxis in humans and animals of such diseases as coronary artery disease and atherosclerosis. The said derivatives also possess anti-inflammatory activity in rats, and are therefore considered to be useful in the treatment of inflammatory conditions such as rheumatoid arthritis in man.

According to the invention we provide new acid derivatives of the formula:

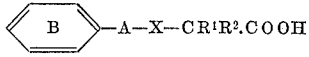

wherein A stands for a straight- or branched-chain alkylene radical; wherein X stands for the oxygen or sulphur atom; wherein $R^1$ stands for hydrogen or for an alkyl radical; wherein $R^2$ stands for an alkyl radical; and wherein the benzene ring B bears at least one substituent selected from halogen atoms and alkyl and alkoxy radicals, and the esters and amides and salts thereof.

As suitable esters of the acid derivatives of the invention there may be mentioned, for example, esters derived from a monohydric alcohol of the formula $R^3OH$, wherein $R^3$ stands for an alkyl, alkoxyalkyl, aminoalkyl, alkylaminoalkyl, dialkylaminoalkyl or alkyleneiminoalkyl radical, or esters derived from a polyhydric alcohol of the formula $D—(OH)_n$, wherein D stands for a straight- or branched-chain alkylene radical and $n$ is an integer from 2 up to the number of carbon atoms in the alkylene radical D, provided that not more than one hydroxyl radical is attached to any one carbon atom of the alkylene radical D.

As suitable amides of the acid derivatives of the invention there may be mentioned, for example, amides derived from an amine of the formula $R^4R^5NH$, wherein $R^4$ and $R^5$, which may be the same or different, stand for hydrogen or for alkyl, alkoxyalkyl, aminoalkyl, alkylaminoalkyl, dialkylaminoalkyl, alkyleneiminoalkyl, carboxyalkyl or alkoxycarbonylalkyl radicals, or wherein $R^4$ and $R^5$ are joined together with the adjacent nitrogen atom to form a heterocyclic radical.

As a suitable value for A there may be mentioned, for example, a straight- or branched-chain alkylene radical of not more than 6 carbon atoms, for example the methylene, ethylene or hexamethylene radical.

As a suitable value for $R^1$, $R^2$, $R^3$, $R^4$ or $R^5$ when it stands for an alkyl radical, there may be mentioned, for example, an alkyl radical of not more than 4 carbon atoms, for example the methyl or ethyl radical.

As a suitable value for the halogen atom which may be a substituent in the benzene ring B there may be mentioned, for example, the chlorine or bromine atom.

As a suitable value for the alkyl or alkoxy radical which may be a substituent in the benzene ring B there may be mentioned, for example, an alkyl or alkoxy radical of not more than 4 carbon atoms, for example the methyl, ethyl, methoxy or ethoxy radical.

As a suitable value for $R^3$, $R^4$ or $R^5$ when it stands for an alkoxyalkyl, aminoalkyl, alkylaminoalkyl, dialkylaminoalkyl or alkyleneiminoalkyl radical there may be mentioned, for example, an alkyl radical of 2, 3 or 4 carbon atoms, for example the ethyl or propyl radical, which is substituted by an alkoxy radical of not more than 4 carbon atoms, for example the methoxy or ethoxy radical, or by an amino radical, or by an alkylamino radical of not more than 4 carbon atoms, for example the methylamino or ethylamino radical, or by a dialkylamino radical wherein neither alkyl part contains more 4 carbon atoms, for example the dimethylamino or diethylamino radical, or by an alkyleneimino radical of not more than 6 carbon atoms, which may optionally be interrupted by an oxygen atom, for example the pyrrolidino, piperidino or morpholino radical. Thus, a particular value for $R^3$, $R^4$ or $R^5$ when it stands for an alkoxyalkyl, aminoalkyl, alkylaminoalkyl, dialkylaminoalkyl or alkyleneiminoalkyl radical is, for example, the β-ethoxyethyl, β-dimethylaminoethyl, β-diethylaminoethyl, γ-dimethylaminopropyl or β-morpholinoethyl radical.

As a suitable value for D there may be mentioned, for example, a straight- or branched-chain alkylene radical of not more than 6 carbon atoms, and as a suitable value for $n$ there may be mentioned, for example, an integer from 2 to 6. Particular polyhydric alcohols of the formula $D—(OH)_n$ are, for example, propylene-1,3-diol and glycerol. It is to be understood that not all the hydroxyl radicals attached to the alkylene radical D need be esterified by the acids of the invention.

As a suitable value for $R^4$ or $R^5$ when it stands for a carboxyalkyl or alkoxycarbonylalkyl radical there may be mentioned, for example, an alkyl radical of not more than 4 carbon atoms which is substituted by a carboxy radical or by an alkoxycarbonyl radical of not more than 5 carbon atoms, for example the methoxy-carbonyl or ethoxycarbonyl radical. Thus, a particular value for $R^4$ or $R^5$ when it stands for a carboxyalkyl or alkoxycarbonylalkyl radical is, for example, the carboxymethyl or ethoxycarbonylmethyl radical.

As a suitable value for the heterocyclic radical formed by $R^4$, $R^5$ and the adjacent nitrogen atom there may be mentioned, for example, a heterocyclic radical of not more than 7 ring atoms, for example the pyrrolidino, piperidino, morpholino or hexamethyleneimino radical.

As suitable salts of the acids of the invention, or of the amides thereof as defined above wherein $R^4$ and/or $R^5$ stands for a carboxyalkyl radical, there may be mentioned, for example, metal salts, for example alkali metal or alkaline earth metal salts, for example sodium, potassium, magnesium or calcium salts, or aluminum or bismuth salts, or ammonium salts.

A preferred group of new acid derivatives of the invention comprises compounds of the formula:

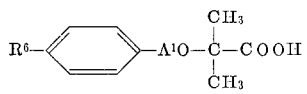

wherein $A^1$ stands for the methylene or ethylene radical, and wherein $R^6$ stands for a halogen atom or an alkyl or alkoxy radical of not more than 4 carbon atoms, and the esters thereof with simple aliphatic alcohols of not more than 4 carbon atoms, and the unsubstituted amides thereof, and the alkali metal and alkaline earth metal salts thereof.

Particularly preferred values for $R^6$ are the chlorine atom and the methyl and methoxy radical, and particularly preferred esters are the methyl and ethyl esters.

Particular new acid derivatives of the invention are, for example, α-p-chlorobenzyloxy-α-methylpropionic acid, α-(2-p-chlorophenylethyloxy) - α - methylpropionic acid and α-p-methylbenzyloxy-α-methylpropionic acid and the salts thereof; α-(2-p-chlorophenylethyloxy)-α-methylpropionamide; and methyl α-p-methoxybenzyloxy-α-methylpropionate.

According to a further feature of the invention we provide a process for the manufacture of the acid derivatives of the invention, and the esters, amides and salts thereof, which comprises the interaction of a metal derivative of the formula:

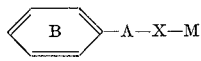

wherein A, B and X have the meanings stated above and wherein M stands for a metal atom, with a halo-carboxylic acid derivative of the formula:

$$Z-CR^1R^2.COOH$$

wherein $R^1$ and $R^2$ have the meanings stated above and wherein Z stands for a halogen atom, or an ester, amide or salt thereof.

As a suitable value for the metal atom M there may be mentioned, for example, an alkali metal atom, for example the sodium or potassium atom.

As a suitable value for the halogen atom Z there may be mentioned, for example, the chlorine, bromine or iodine atom.

The process may be carried out in a diluent or solvent, for example benzene, toluene, xylene or dimethylformamide, and it may be accelerated or completed by the application of heat, for example by heating at the boiling point of the diluent or solvent.

It is to be understood that when the halo-carboxylic acid itself, or an amide thereof as defined above wherein $R^4$ and/or $R^5$ stands for a carboxyalkyl radical, is used as starting material then a sufficient excess of the metal derivative starting material must be used to neutralise all the carboxyl groups in the first-mentioned starting material.

According to a further feature of the invention we provide a process for the manufacture of the acid derivatives of the invention and the salts thereof, which comprises the interaction of a compound of the formula:

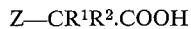

wherein A, B and X have the meanings stated above, with a carbonyl compound of the formula $R^1COR^2$, wherein $R^1$ and $R^2$ have the meanings stated above, in the presence of a tri- or tetra-halogenated methane derivative and a strong base.

The tri- or tetra-halogenated methane derivative may be, for example, chloroform, bromoform, iodoform, carbon tetrachloride or carbon tetrabromide. A preferred derivative is chloroform.

The strong base may be, for example, an alkali metal hydroxide, for example sodium hydroxide or potassium hydroxide, which preferably is used in the solid form.

The interaction may be carried out in a diluent or solvent, for example in an excess of the carbonyl compound of the formula $R^1COR^2$, wherein $R^1$ and $R^2$ have the meanings stated above, and it may be accelerated or completed by the application of heat, for example by heating at the boiling point of the diluent or solvent.

The acid derivatives of the invention may be converted into the esters or amides or salts thereof by conventional means, and the esters of the acid derivatives may be converted into the amides of the acid derivatives by conventional means. Alternatively, the esters or amides of the acid derivatives may by hydrolysed to the acid derivatives themselves by conventional means, and those of the acid amides as defined above wherein $R^4$ and/or $R^5$ stands for an alkoxycarbonylalkyl radical may be converted into the corresponding amides wherein $R^4$ and/or $R^5$ stands for a carboxyalkyl radical by hydrolysis.

Thus, according to a further feature of the invention we provide a process for the manufacture of the esters or amides of the acid derivatives of the invention as defined above which comprises the interaction of an activated derivative of an acid derivative of the invention with an alcohol of the formula $R^3OH$ or $D-(OH)_n$, wherein $R^3$, D and $n$ have the meanings stated above, or with an amine of the formula $R^4R^5NH$, wherein $R^4$ and $R^5$ have the meanings stated above.

A suitable activated derivative of the acid derivative of the invention is, for example, an acid halide, for example the acid chloride, or an acid anhydride. The last-mentioned interaction may be carried out in a diluent or solvent, for example tetrahydrofuran or benzene, and it may be carried out at ambient temperature or it may be accelerated or completed by the application of heat, for example by heating to the boiling point of the diluent or solvent. The interaction may also be accelerated by the presence of a basic catalyst, for example N,N-dimethylaniline or pyridine.

According to a further feature of the invention we provide pharmaceutical compositions which comprise as active ingredient at least one of the new acid derivatives of the invention in association with a pharmaceutically-acceptable diluent or carrier therefor.

The compositions may be formulated by conventional means so as to be suitable for oral administration, for example in the form of tablets, capsules, aqueous or oily suspensions, emulsions, aqueous or oily solutions, dispersible powders, syrups or elixirs. Preferred compositions are hard or soft gelatin capsules or tablets containing between 0.05 g. and 0.5 g. of active ingredient. It is expected that a patient undergoing treatment will receive between 0.5 g. and 2 g. of active ingredient per day.

The invention is illustrated but not limited by the following examples in which the parts are by weight.

EXAMPLE 1

To a stirred mixture of 30 parts of a 50% dispersion of sodium hydride in oil and 300 parts of xylene is added a solution of 85 parts of p-chlorobenzyl alcohol in 1,000 parts of xylene during 30 minutes. The mixture is heated under reflux for 30 minutes and is then cooled to ambient temperature. 120 parts of ethyl α-bromo-α-methylpropionate are added and the mixture is heated under reflux for 12 hours. The mixture is cooled and poured into water. The xylene layer is separated and evaporated to dryness. To the residue are added 300 parts of ethanol, 40 parts of potassium hydroxide and 100 parts of water and the mixture is heated under reflux for 12 hours. The ethanol is removed by evaporation and to the residue are added 1,000 parts of water. The aqueous solution is washed with ether and acidified with hydrochloric acid, and the mixture is filtered. The solid product is washed with water, dried and crystallised from petroleum ether (B.P. 60–80° C.). There is thus obtained α-p-chlorobenzyloxy-α-methylpropionic acid, M.P. 90° C.

EXAMPLE 2

110 parts of 2-p-chlorophenylethanol are added at ambient temperature during 45 minutes to a stirred mixture of 34 parts of a 50% dispersion of sodium hydride in oil (from which the oil has been washed with xylene) and 1,350 parts of xylene. The mixture is then stirred at 100° C. for 1 hour, cooled to 50° C. and 136 parts of ethyl α-bromo-α-methylpropionate are added during 30 minutes. The mixture is stirred at a temperature of 100–110° C. during 12 hours, and is then cooled, washed twice with water and evaporated to dryness under reduced pressure. To the residue are added 800 parts of ethanol, 180 parts of water and 90 parts of potassium hydroxide and the mixture is heated under reflux during 4 hours. The mixture is evaporated to dryness under reduced pressure and the residue is added to 2,500 parts of water. The mixture is washed three times with ether, charcoal is added and the mixture is filtered. The filtrate is acidified with concentrated hydrochloric acid and the mixture is extracted three times with 250 parts of ether each time. The combined ethereal extracts are washed with water, dried and evaporated to dryness. The residue solidifies slowly on standing and is then crystallised from petroleum ether (B.P. 40–60° C.). There is thus obtained α-(2-p-chlorophenylethyloxy)-α-methylpropionic acid, M.P. 48–50° C.

EXAMPLE 3

A mixture of 12.2 parts of p-methylbenzyl alcohol, 23 parts of sodium hydroxide and 80 parts of acetone is stirred and heated under reflux. 3.75 parts of chloroform are added, the mixture is heated under reflux for 15 minutes, and a further 11.25 parts of chloroform are added during 15 minutes at such a rate that the mixture continues to boil gently. The mixture is stirred and heated under reflux for a further 4 hours, and is then cooled and evaporated to dryness. The residue is dissolved in 200 parts of water and the solution is washed twice with 100 parts of ether each time. Charcoal is added, the mixture is filtered and the filtrate is acidified with concentrated hydrochloric acid. The mixture is cooled and filtered and the solid product is dried and crystallised from petroleum ether (B.P. 60–80° C.). There is thus obtained α-p-methylbenzyloxy-α-methylpropionic acid, M.P. 71–83° C.

EXAMPLE 4

A mixture of 4 parts of α-(2-p-chlorophenylethyloxy)-α-methylpropionic acid and 10 parts of thionyl chloride is heated under reflux for 5 minutes and then evaporated to dryness. The residue is poured into 20 parts of ice-cold concentrated aqueous ammonium hydroxide solution and the mixture is stirred for 1 hour and then filtered. The solid product is washed with water, dried and crystallised from cyclohexane. There is thus obtained α(2 - p - chlorophenylethyloxy)-α-methylpropionamide, M.P. 112–113° C.

EXAMPLE 5

30 parts of chloroform are added during one hour to a stirred mixture of 27.5 parts of p-methoxybenzyl alcohol, 45 parts of sodium hydroxide and 160 parts of acetone, which is heated under reflux, at such a rate that the mixture refluxes gently without further heating. The mixture is stirred and heated under reflux for a further 4 hours and is then cooled and evaporated to dryness. The residue is dissolved in 500 parts of water and the solution is washed four times with ether. Charcoal is added, the mixture is filtered and the filtrate is acidified with concentrated aqueous hydrochloric acid. The mixture is extracted with benzene, and the benzene extract is dried and evaporated to dryness under reduced pressure. The residual oil is dissolved in 300 parts of ether and the solution is added to a solution of 2.7 parts of diazomethane in 400 parts of ether which is cooled to 10° C. The solution is kept at ambient temperature for 18 hours and is then washed successively with aqueous 2 N-hydrochloric acid, aqueous 0.5 N sodium hydroxide solution and water. The ethereal solution is dried and evaporated to dryness and the residual oil is distilled under reduced pressure. There is thus obtained methyl α-p-methoxybenzyloxy-α-methyl-propionate, B.P. 113–114°C./0.5 mm.

EXAMPLE 6

A mixture of 100 parts of α-p-chlorobenzyloxy-α-methyl-propionic acid, 94 parts of maize starch and 3 parts of magnesium stearate is compressed into slugs. The slugs are broken into granules which are then passed through an 8-mesh screen. The granules are then coated with a sufficient quantity of a solution of 15 parts of shellac and 3 parts of castor oil in 800 parts of ethyl alcohol; 3 parts of magnesium stearate are then added to the granules after which they are compressed to give tablets suitable for oral use for therapeutic purposes.

The α-p-chlorobenzyloxy-α-methylpropionic acid used in the above example may be replaced by an equal quantity of any other of the active ingredients hereinbefore described, and there are thus obtained in similar manner tablets suitable for oral administration for therapeutic purposes.

What we claim is:

1. A compound selected from the group consisting of acids of the formula:

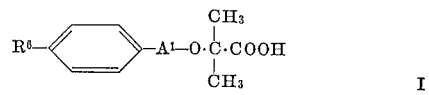

wherein $A^1$ is methylene or ethylene, $R^6$ is halogen or alkyl or alkoxy of 1–4 carbon atoms, the esters derived from an acid of the Formula I and an alkanol of 1–4 carbon atoms, and the alkali metal and alkaline earth metal salts of acids of the Formula I.

2. An acid derivative as claimed in claim 1 wherein $A^1$ is methylene or ethylene and wherein $R^6$ is chlorine, methyl or methoxy, or the methyl or ethyl ester thereof, or the sodium, potassium or calcium salt thereof.

3. The compound claimed in claim 1 which is α-p-chlorobenzyloxy-α-methylpropionic acid or a salt thereof.

4. The compound claimed in claim 1 which is α-(2-p-chlorophenylethyloxy)-α-methylpropionic acid or a salt thereof.

5. The compound claimed in claim 1 which is α-p-methylbenzyloxy-α-methylpropionic acid or a salt thereof.

6. The compound claimed in claim 1 which is methyl α-p-methoxybenzyloxy-α-methylpropionate.

References Cited

UNITED STATES PATENTS 3,124,588   3/1964   Reisne _____ 260—306.8

OTHER REFERENCES

Chemical Abstracts, Vol. 56, p. 15395c (Viout & Gault) 1962.

LORRAINE A. WEINBERGER, Primary Examiner

E. J. GLEIMAN, Assistant Examiner

U.S. Cl. X.R.

260—247.1, 247.2, 293.4, 294, 294.3, 326.8, 326.84, 470, 516, 521, 558, 559; 424—308, 317, 324